(12) United States Patent
Hewinson (10) Patent No.: US 8,744,995 B1
(45) Date of Patent: Jun. 3, 2014

(54) ALIAS DISAMBIGUATION

(75) Inventor: Philip Hewinson, London (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/561,621

(22) Filed: Jul. 30, 2012

(51) Int. Cl.
*G06F 7/00* (2006.01)
*G06F 17/30* (2006.01)

(52) U.S. Cl.
CPC .... *G06F 17/30377* (2013.01); *G06F 17/30616* (2013.01)
USPC .......................................... 707/603; 707/687

(58) Field of Classification Search
CPC .................... G06F 17/30377; G06F 17/30616
See application file for complete search history.

(56) References Cited

U.S. PATENT DOCUMENTS

| | | | |
|---|---|---|---|
| 5,369,685 A | 11/1994 | Kero | |
| 5,483,586 A | 1/1996 | Sussman | |
| 5,752,232 A | 5/1998 | Basore et al. | |
| 5,991,364 A | 11/1999 | McAllister et al. | |
| 6,044,399 A | 3/2000 | Elledge | |
| 6,463,533 B1 | 10/2002 | Calamera et al. | |
| 6,650,735 B2 | 11/2003 | Burton et al. | |
| 6,768,792 B2 | 7/2004 | Brown et al. | |
| 6,999,930 B1 | 2/2006 | Roberts et al. | |
| 7,120,927 B1 | 10/2006 | Beyda et al. | |
| 7,487,089 B2 | 2/2009 | Mozer | |
| 7,526,073 B2 | 4/2009 | Romeo | 379/88.18 |
| 7,536,304 B2 | 5/2009 | Di Mambro et al. | |
| 7,571,100 B2 | 8/2009 | Lenir et al. | |
| 7,747,446 B2 | 6/2010 | Blass et al. | |
| 7,890,957 B2 | 2/2011 | Campbell | 719/313 |
| 7,966,171 B2 | 6/2011 | Gilbert et al. | |
| 7,970,384 B1 | 6/2011 | Lambert et al. | 455/412.1 |
| 8,095,672 B1 | 1/2012 | Newstadt et al. | |
| 8,140,340 B2 | 3/2012 | Bhogal et al. | |
| 8,166,168 B2 * | 4/2012 | Hayashi et al. | 709/226 |
| 8,185,646 B2 | 5/2012 | Headley | |
| 8,218,744 B2 | 7/2012 | Belz et al. | |
| 8,219,404 B2 | 7/2012 | Weinberg et al. | |
| 8,225,103 B2 | 7/2012 | Chiou et al. | |
| 8,302,152 B1 | 10/2012 | Hewinson | |
| 8,358,759 B2 | 1/2013 | Kumar | |
| 2002/0147914 A1 | 10/2002 | Arnold | |
| 2002/0152272 A1 | 10/2002 | Yairi | |
| 2005/0164651 A1 | 7/2005 | Ollis et al. | |
| 2005/0232470 A1 | 10/2005 | Chaudhari et al. | |
| 2006/0035632 A1 | 2/2006 | Sorvari et al. | 455/418 |
| 2006/0235684 A1 | 10/2006 | Chang | 704/233 |
| 2006/0277043 A1 | 12/2006 | Tomes et al. | |
| 2006/0293891 A1 | 12/2006 | Pathuel | |

(Continued)

OTHER PUBLICATIONS

Aswani et al., "Mining Information for Instance Unification", ISWC 2006, LNCS 4273, pp. 329-342, 2006, Springer-Verlag Berlin Heidelberg.*

(Continued)

*Primary Examiner* — Michael Hicks
(74) *Attorney, Agent, or Firm* — Fish & Richardson P.C.

(57) ABSTRACT

Methods, systems, and apparatus, including computer programs encoded on a computer storage medium, for disambiguation of aliases. A method includes selecting a particular alias, selecting one or more past communications in which the particular alias is used, identifying an item of recipient contact information associated with the selected past communication, identifying a contact record associated with the recipient contact information, and for each contact record, generating or updating a score for the alias, and storing the score in association with the contact record.

21 Claims, 5 Drawing Sheets

(56) References Cited

U.S. PATENT DOCUMENTS

| | | | |
|---|---|---|---|
| 2007/0060114 A1 | 3/2007 | Ramer et al. ............... 455/418 |
| 2007/0066288 A1 | 3/2007 | Soelberg et al. |
| 2007/0100929 A1 | 5/2007 | DeRobertis et al. |
| 2007/0169202 A1 | 7/2007 | Goldberg et al. |
| 2008/0037720 A1 | 2/2008 | Thomson et al. .......... 379/88.01 |
| 2008/0082332 A1 | 4/2008 | Mallett et al. |
| 2010/0030738 A1 | 2/2010 | Geer |
| 2010/0088753 A1 | 4/2010 | Ayres et al. |
| 2010/0161338 A1 | 6/2010 | Tofighbakhsh |
| 2010/0316198 A1 | 12/2010 | Balasaygun et al. |
| 2011/0022388 A1 | 1/2011 | Wu et al. |
| 2011/0047076 A1 | 2/2011 | Carlson et al. |
| 2011/0047245 A1 | 2/2011 | Abramson et al. |
| 2011/0082874 A1 | 4/2011 | Gainsboro et al. |
| 2011/0177829 A1 | 7/2011 | Platt et al. ............... 455/456.2 |
| 2011/0194682 A1 | 8/2011 | Hans et al. ............. 379/201.04 |
| 2011/0221671 A1 | 9/2011 | King et al. |
| 2011/0231310 A1 | 9/2011 | Roberts et al. |
| 2011/0258686 A1 | 10/2011 | Raj et al. |
| 2011/0288866 A1 | 11/2011 | Rasmussen |
| 2011/0302128 A1* | 12/2011 | Hayashi et al. ............... 706/52 |
| 2012/0022874 A1* | 1/2012 | Lloyd et al. ................ 704/275 |
| 2012/0065973 A1 | 3/2012 | Cho et al. |
| 2012/0078638 A1 | 3/2012 | Novack et al. |
| 2012/0084078 A1 | 4/2012 | Moganti et al. |
| 2012/0134478 A1 | 5/2012 | Broman et al. |
| 2012/0173239 A1 | 7/2012 | Sánchez et al. |
| 2012/0232900 A1 | 9/2012 | Brummer et al. |
| 2012/0239407 A1 | 9/2012 | Lynch et al. |
| 2012/0253790 A1 | 10/2012 | Heck et al. |
| 2012/0253811 A1 | 10/2012 | Breslin et al. |
| 2012/0260188 A1 | 10/2012 | Park et al. |
| 2012/0310980 A1 | 12/2012 | Hepper |
| 2013/0006634 A1 | 1/2013 | Grokop et al. |

OTHER PUBLICATIONS

Pantel, "Alias detection in malicious environments", Proceedings of AAAI fall symposium on capturing and using patterns for evidence detection, pp. 14-20, 2006.*

Minkov et al., "Contextual Search and Name Disambiguation in Email Using Graphs", SIGIR '06, pp. 27-34, 2006, ACM.*

Holzer et al., "Email Alias Detection Using Social Network Analysis", LINKKDD 2005, pp. 52-57, 2005, ACM.*

Kumari et al., "Automatic Detection of Name Dlsambiguation and Extracting Aliases for the Personal Name", International Journal of Computational Engineering Research, vol. 2, Issue 5, pp. 1376-1383, Sep. 2012.*

Elsayed at al., "Resolving Personal Names in Email Using Context Expansion", Proceedings of ACL-08: HLT, pp. 941-949, 2008, ACM.*

Office Action issued in U.S. Appl. No. 13/572,208 on Dec. 6, 2012, 12 pages.

Office Action issued in U.S. Appl. No. 13/572,369 on Dec. 28, 2012, 9 pages.

Notice of Allowance issued in U.S. Appl. No. 13/572,369 on Feb. 6, 2013, 7 pages.

Notice of Allowance issued in U.S. Appl. No. 13/572,369 on Mar. 22, 2013, 15 pages.

Notice of Allowance issued in U.S. Appl. No. 13/572,208 on Mar. 29, 2013, 18 pages.

Office Action issued in U.S. Appl. No. 13/572,364 on Apr. 11, 2013, 22 pages.

Notice of Allowance issued in U.S. Appl. No. 13/572,369 on Jul. 1, 2013, 17 pages.

Notice of Allowance issued in U.S. Appl. No. 13/572,208 on Jul. 12, 2013, 11 pages.

Benyon et al., "Adaptive Systems: from intelligent tutoring to autonomous agents", 52 pages, 1993, downloaded from the internet on Aug. 1, 2012, http://citeseerx.ist.psu.edu/viewdoc/summary?doi=10.1.1.63.3407.

Cohen et al., "An Open Agent Architecture", 8 pages, 1994, downloaded from the Internet on Aug. 1, 2012, http://citeseerx.ist.psu.edu/viewdoc/similar?doi=10.1.1.30.480&type=ab.

Maes, Patti, "Agents that Reduce Work and Information Overlad", file:///C|/Mis documentos/alberto/itesm/Sistemas/material_curso/maes94/maes94.html, Oct. 10, 2000, 17 pages.

Nardi et al., "Collaborative, Programmable Intelligent Agents", Communications of the ACM, vol. 41, No. 3, Mar. 1998, 9 pages.

Office Action issued in U.S. Appl. No. 13/572,364 on Oct. 15, 2012, 21 pages.

* cited by examiner

ALIAS DISAMBIGUATION

BACKGROUND

This specification relates to speech recognition and, according to one exemplary implementation, to the disambiguation of aliases.

Users of mobile computing devices often find it more convenient to initiate a communication by entering the name of an intended recipient of the communication rather than by entering the recipient's contact information. For example, to initiate a telephone call, a user of a mobile device may speak the name of the callee, instead of speaking a telephone number.

This approach is generally successful as long the name as entered by the user explicitly matches a single contact record in the user's address book. If, however, the name does not explicitly match a single contact record, the mobile device may fail to initiate the communication, or may initiate communication with the wrong recipient.

SUMMARY

This specification describes systems and processes for deriving a communication recipient's alias based on a user of a mobile device's stored electronic communications, and for enabling the user to initiate a communication by entering the communication recipient's alias. In brief, this can be accomplished by parsing the user's stored electronic communications to find instances where the user referred to the recipient of the communication using an alias. The contact information for that communication can be derived and, in turn, the alias can be matched with a contact record, or multiple contact records, that are associated with that contact information in the user's address book. The server system can, either alone or in conjunction with the mobile device, identify the communication recipient that the user intends to communicate with based on the input of an alias, and can initiate a communication to the communication recipient.

As used by this specification, "contact information" (or "an item of contact information") may refer to any coded or uncoded representation of a destination of a communication, such as a telephone number, e-mail address, physical or mailing address, handle, social network identifier, instant messaging (IM) address, website name, or network address.

As used by this specification, a "contact" may refer to any person or entity for whom a corresponding "contact record" is stored in an address book. The contact record is stored in the address book under a name associated with the contact (e.g., a username, personal name, nickname, chat name, account name, screen name, or entity name). A contact record stored in an address book may have associated with it one or more items of contact information. For example, a contact record for a person may include an e-mail address as first item of contact information, and a phone number as a second item of contact information, and so on. A contact record may be used by a mobile device to identify the intended recipient of a communication. For example, if the user inputs a command to initiate a phone call to a name of a certain person, the mobile device may try to find a particular contact record in the address book that matches the name that was input by the user. If the mobile device successfully finds a contact record that matches the name that was input by the user, the mobile device may initiate the phone call as desired by the user. But, if the mobile device fails to find a contact record that matches the name that was input by the user, the mobile device may be unable to initiate the phone call, or may initiate communication with an incorrect recipient.

As used by this specification, "address book" may refer to a compilation of one or more individual contact records stored in a mobile computing device or at a server. The address book can provide a convenient means for a user to remember and organize information regarding the contacts they may wish to communicate with. The address book may also include their contact's corresponding contact information, such as phone numbers, physical addresses, and e-mail addresses. For example, a user may choose to create an address book containing contact records for their friends, family members, business associates, clients, or business entities. For each such person or entity (contact record), the user can store one or more items of contact information. For example, a user may choose to store their friend's e-mail address, mobile phone number, home phone number, and work phone number.

As used by this specification, an "alias" may refer to any name or identifier, or an alternate name or identifier, used to represent a person or entity. Some aliases are commonly associated with proper names. For example, a mobile device user may input a command including a name such as "call Chuck." The name "Chuck" is a common alias for "Charles." In addition, names or identifiers without any such common association to a proper name can be an alias. In that sense, "Chuck" may be an alias that is used to represent any proper name for a person or entity.

A "communication" may refer to any synchronous or asynchronous conveyance or exchange of news, views, or information between two human or non-human entities, such as a message (e.g., an e-mail message, an instant message, a social network message or post), a document (e.g., an electronic file or physical mail), a telephonic communication (e.g., a transcribed voice-message or telephone call) or a video communication (e.g., a video conference, on-line meeting, video chat, video telephone, SKYPE sessions, FACETIME sessions).

Furthermore, "initiating a communication," refers to an act or operation of directly or indirectly beginning, setting going, originating, generating, or starting a communication. In various contexts, initiating a communication may include dialing a telephone number, entering a voice command, opening a blank or pre-addressed e-mail message, or opening an instant messaging session, or causing a computer to perform these acts. For example, in other contexts, initiating a communication includes instructing a software application to perform an operation such as dialing a telephone number, addressing a blank e-mail message, or opening an instant messaging session with a contact. When a communication is to be initiated using a particular item of contact information, such information can be passed to the software application, for example as metadata, with the instruction to perform a communication initiation operation. Passing the item of contact information as metadata obviates the need for the user to manually enter the contact information.

A "past communication" with a contact may include a past initiated or consummated communication, or a past non-communicative act relating to the contact. For instance, a past interaction may occur when a user initiates or completes a phone call with a contact, or conducts a phone call that lasts more than a predetermined duration. Alternatively, a past interaction may occur when the user adds the contact to an address book, or reads or accesses content prepared by the contact, communicates with a third party about the contact, is assigned to a cluster of users that includes the contact, or is determined to be in within the physical proximity of the contact.

Accordingly, one innovative aspect of the subject matter described in this specification may be embodied in methods that include the actions of estimating a probability that a user intends to initiate communication with a particular contact, or using a particular item of contact information. The probability may be estimated based on past communications between the user and the particular contact, or based on past use of the particular item of contact information to initiate a communication with the contact.

In general, an innovative aspect of the subject matter described in this specification may be embodied in methods that include the actions of selecting a particular alias, selecting one or more past communications in which the particular alias is used, for each of the past communications, identifying an item of recipient contact information associated with the past communication, for each item of recipient contact information, identifying a contact record associated with the item of recipient contact information, for each contact record, generating or updating a score for the particular alias, said score representing an estimated confidence that the particular alias corresponds to the associated contact record, and storing the score in association with the contact record.

Other embodiments of this aspect include corresponding systems, apparatus, and computer programs, configured to perform the actions of the methods, encoded on computer storage devices.

These and other embodiments may each optionally include one or more of the following features. For instance, for one or more of the contact records, storing data specifying the alias and the score for the contact record; selecting a particular alias further includes selecting the particular alias from a collection of known aliases; selecting a particular alias further includes identifying the particular alias from a past communication; selecting another alias, selecting one or more other past communications in which the other alias is used, for each of the one or more other past communications, identifying an additional item of recipient contact information associated with the past communication, for each additional item of recipient contact information, identifying an additional contact record associated with the additional item of recipient contact information, and for each additional contact record, generating or updating a score for the other alias, and storing the score in association with the additional contact record, wherein one or more particular additional contact record store both a score for the other alias and a score for the alias; the scores are stored in contact records in an address book on a mobile computing device or on a server system; the scores are based on a quantity of past communications in which the particular alias is used that are associated with the contact records; the scores are based on a position of the particular alias in the selected one or more past communications; one or more of the items of recipient contact information further include an e-mail address or a telephone number; in response to a request for a contact record associated with an alias, providing the contact record having a highest score for the alias.

Particular embodiments of the subject matter described in this specification may be implemented to realize one or more of the following advantages. The convenience of initiating a communication via a mobile device, especially voice-initiated communication such as voice dialing, may be improved, thereby enhancing the user experience and increasing user satisfaction. For example, a user may be able to initiate communications without having to remember the recipient's contact information, such as a telephone number. Further, a user may be able to initiate communications without having to remember the name of the recipient as it is stored in the user's address book. A user may be able to initiate communications using an alias for the recipient that they would use in normal conversation. A user's own past communications may be used to correlate the aliases they use to refer to recipients of communications. Parsing of past communications and other complex tasks may be performed at the server side, instead of on the user's mobile device, to allow for enhanced process optimization and to increase computational efficiency.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers represent corresponding parts throughout.

DETAILED DESCRIPTION

Figure 1A:
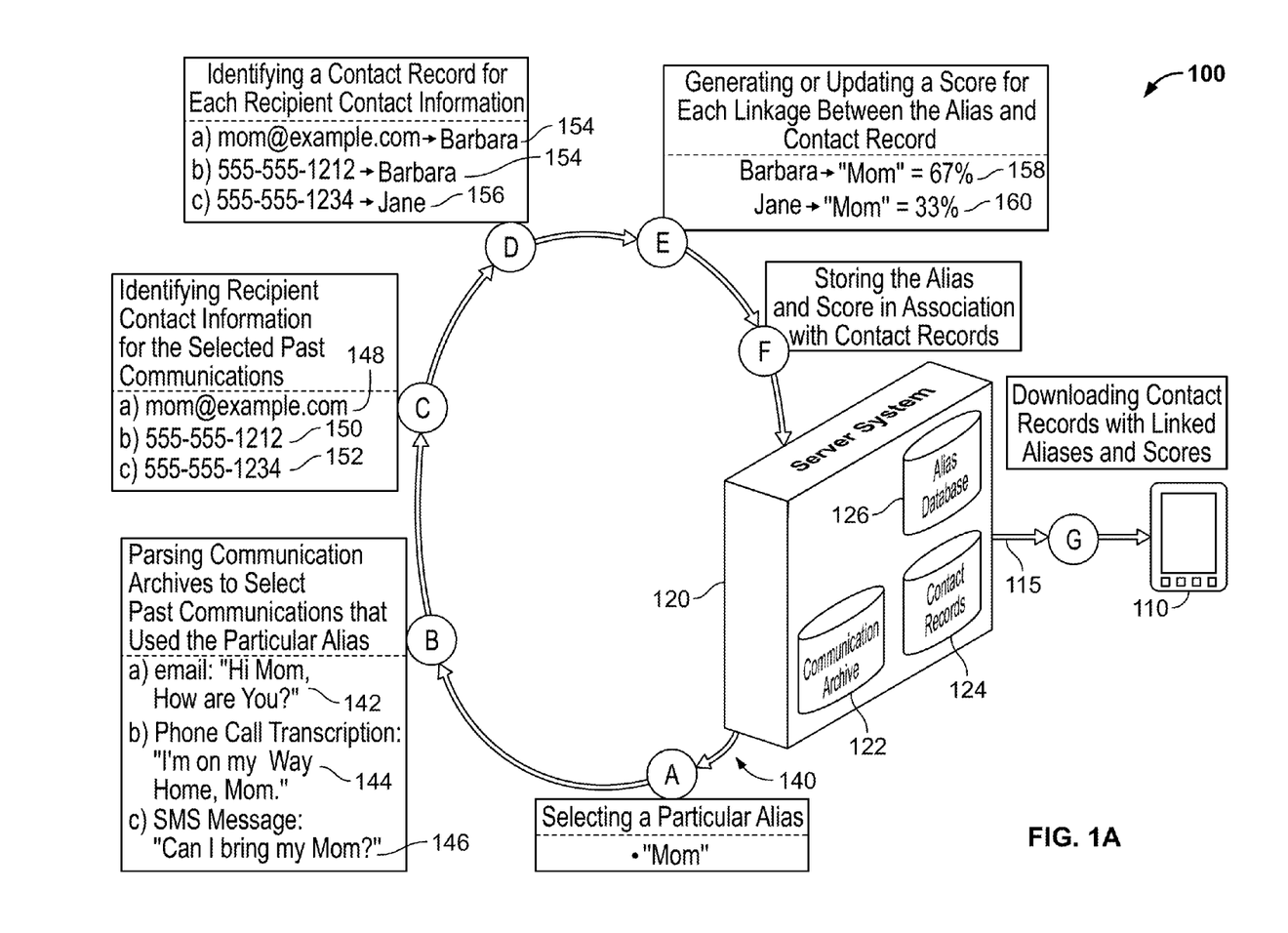
FIG. 1A is a diagram of an example system and process that uses past communications to augment contact records with correlations to aliases.

FIG. 1A is a diagram of an example system 100 and alias disambiguation process 140 that uses past communications to augment contact records with correlations to aliases. Operations (A) through (G), shown in FIG. 1A, are actions that can occur when the alias disambiguation process 140 for analyzing a user's past communications is performed by the system 100.

In general, the example system 100 includes a mobile computing device ("mobile device") 110 (e.g., a cellular telephone, a PDA, a music player, a tablet computer, laptop computer, e-book reader, wearable computer, or other processing device), and a server system 120 (e.g., an application service provider system, a search engine, or another server system that includes one or more processors, wherein such server systems can be distributed across multiple servers including a cloud-based distributed computer system). The mobile device 110 and server system 120 are connected by way of one or more networks 115. The one or more networks 115 may include, for example, a wireless cellular network, a wireless local area network (WLAN) or Wi-Fi network, a Third Generation (3G) or Fourth Generation (4G) mobile telecommunications network, a private network such as an intranet, a public network such as the Internet, or any appropriate combination thereof.

The server system 120 can include a user communication archive 122. The user communication archive 122 can be one or more repositories for storing a user's communications. The user's communications can include, for example, e-mail messages, instant messages, SMS text messages, social network messages and posts, video or telephonic communications (e.g., a transcribed video sessions or 'hangouts,' voice-messages or telephone calls). The user's communication archive 122 can be spread across multiple servers that can be individually accessed during performance of the example process depicted in FIG. 1A. For instance, the user communication archive 122 can also be stored on The Cloud.

The server system 120 can also include a repository of user contact records 124. A contact record can be an electronic address book entry representing a person or entity that the user may to communicate with. A user's contact records 124 are collectively referred to as the user's address book. The server-based user contact records 124 may be automatically maintained to correspond with contact records stored on the user's mobile device 110 using a synchronization process. The contact records 124 can be created and maintained by a particular mobile device user, such as the user of mobile device 110 in FIG. 1A, or by an organization of users, such as a business organization.

Each contact record can be indexed, stored or accessed under a particular name or identifier (e.g., a contact's proper name) that is assigned by the user of the mobile device 110. Each contact record may have one or more items of contact information, such as e-mail addresses, phone numbers, physical addresses, and website addresses. As described further below, resulting from the enhanced communication recipient identification process provided herein, a contact record may also have associated with it one or more aliases and alias scores. The contact records 124 may be stored across more than one server or device.

The server system 120 can also include an alias database 126. The alias database 126 can be a repository of known or dynamically discovered aliases. For example, there are many commonly known aliases, such as "Mom," "Dad," "Sis," "Buddy," and "Honey." There are known aliases that are informal versions of personal names, such as "Bob," "Rob," "Jim," "Jimmy," "Barb," and "Rick." The alias database 126 can also include any other aliases that are dynamically discovered as a result of the techniques as described herein. A database of known and discovered aliases, such as the examples provided, can be created and stored as the alias database 126 in the server system 120.

The alias disambiguation process 140, including operations (A) through (G), generally illustrate a process that can be performed offline or in the background with respect to mobile device 110. In other words, mobile device 110 can continue to be used without any effects or limitations from the performance of alias disambiguation process 140, even while operations (A) through (G) are ongoing. The alias disambiguation process 140 may be initiated on a periodic or dynamically initiated basis. For example, the alias disambiguation process 140 may automatically run every night, or perhaps less frequently like once a week. Alternatively, or in addition, the alias disambiguation process 140 may be manually initiated by the user of mobile device 110. As will be explained more fully below, the operations (A) through (F) can be thought of as an iterative process that is repeated until complete. When operations (A) through (F) have been repeated and completed, then operation (G) can occur a single time as the final operation of the process.

Operation (A) can include the selection of a particular alias. This operation can be performed by a processor of the server system 120 that can access the alias database 126 to select a particular alias from the alias database 126. For instance, referring to the illustrated example to demonstrate alias disambiguation process 140, the particular alias "Mom" can be chosen from the alias database 126. As described below regarding operation (B), the particular alias will be used later to identify past communications. Selection of the particular alias can occur when an alias to evaluate is received from another system.

As an alternative to selecting a particular alias from the alias database 126, a particular alias can be dynamically selected by intelligently parsing the user's past communications to identify words that are likely to be aliases. For example, given an e-mail message that begins with "Hi [word]," it can reasonably be assumed that [word] represents the name of the e-mail recipient. If that name is not found as a contact in the contact records 124, the name can be deemed to be an alias, and it can then be selected as a particular alias in regard to operation (A).

In operation (B), the server system 120 can search the user's past communications stored in the communication archive 122 to select past communications in which the particular alias selected in operation (A) occur. In other words, the particular alias selected in operation (A) can be used for parsing the user's past communications as a keyword search.

For instance, in the example provided, using the particular alias "Mom" results in the selection of three past communications containing the term "Mom." These three past communications containing "Mom" were identified from among the user's past communications stored in the communication archive 122. As depicted, the first selected past communications was an e-mail message 142. The second selected communication was a transcription of a telephone call 144. The third selected communication was an SMS message 146. Again, the common characteristic determining the selection of the past communications in operation (B) can be the presence in the communication of the particular alias selected in operation (A).

In operation (C), server system 120 can identify recipient contact information corresponding to the selected past communications from operation (B). As defined above, contact information may refer to any representation of a destination of a communication, such as a telephone number, e-mail address, physical or mailing address, instant messaging (IM) address, website name, or network address. Using the example to illustrate operation (C), the system identifies: (i) a recipient's email address 148 corresponding to the first selected past communication (which was an email 142), (ii) a recipient's telephone number 150 corresponding to the second selected past communication (which was a phone call transcription 144), and (iii) a recipient's telephone number 152 corresponding to the third selected past communication (which was a SMS message 146). In this manner a recipient's contact information can be identified for each of the select past communications—each of which contained the selected alias.

In operation (D), the server system 120 can identify a contact record corresponding to the recipient contact information identified in operation (C). As defined above, a contact record may refer to an electronic entry in a user's address book representing a person or entity, and including one or more items of contact information. In operation (D) then, identified recipient contact information from operation (C) (e.g., e-mail addresses or phone numbers) are matched up with contact information stored in the contact records 124 of the server system 120. When a match of contact information is determined, the corresponding contact record can be deemed as potentially corresponding to the particular alias. In this manner, at operation (D) a contact record stored in the user's address book can be identified for the past communications that used the particular alias selected in operation (A).

Using the example to illustrate operation (D), the first item of recipient contact information ("mom@example.com" 148) was found in operation (D) as the contact information for a contact record stored in the repository of contact records 124 under the contact name "Barbara" 154. The second item of recipient contact information ("555-555-1212" 150) was also found to exist under the contact name "Barbara" 154. The third item of recipient contact information ("555-555-1234" 152) was found to exist under the contact name "Jane" 156. In summary, the outcome of operation (D) is: (a) "mom@example.com" is correlated to "Barbara" 154, (b) "555-555-1212" is correlated to "Barbara" 154, and (c) "555-555-1234" is correlated to "Jane" 156.

In some cases, however, no match of a past communication's recipient contact information may exist in the contact records 124. Simply stated, if the user communicated to someone who is not in the user's address book, then operation (D) may not result in identifying a correlation between the contact information and a contact record. In that case, server system 120 can add a new contact record in the repository of contact records 124 as a placeholder.

In operation (E), the server system can generate or update a score for each correlation between the particular alias and the contact record(s) that were identified in operation (D). The score can represent an estimated confidence or probability that the particular alias actually corresponds to the associated contact record. For instance, the example depicts a confidence level score 158 of 67% for the correlation between the alias "Mom" and the contact record "Barbara" 154. It also shows a confidence level score 160 of 33% for the correlation between the alias "Mom" and the contact record "Jane" 156. Simply put, the example operation (E) generated scores that indicate it is likely but not certain that the alias "Mom" refers to "Barbara" 154, and there is also some chance that "Mom" refers to "Jane" 160.

The scores shown in FIG. 1 are generated by server system 120 in accordance with an example algorithm. Namely, the results of operation (D) identified that, out of three past communications containing the alias "Mom," two correlated to "Barbara" 154, and one correlated to "Jane" 156. Hence, on a percentage basis, it can be determined that there is a 67% probability (two out of three) that the alias "Mom" refers to "Barbara" 154, and a 33% probability (one out of three) that it refers to "Jane" 156.

The scoring system used in operation (E) can be more sophisticated than the example above. For example, the scoring system can be an algorithm that uses a variety of inputs and weighting factors. The following examples of algorithm inputs and weighting factors are offered by way of illustration and not limitation. For example, a potential alias found immediately after a salutation at the beginning of a communication (e.g., "Dear Mom,") could be given a higher weight than a potential alias found elsewhere in a communication. The time of day that the user initiates a communication could be another input to the scoring algorithm (e.g., typical business hours versus personal hours, or weekends versus weekdays). The geographical location of the user when initiating a communication could also be an input (e.g., at the workplace, car, home, frequent vacation spot). The form of communication (e.g., whether the past communication was by e-mail, phone call, or SMS message) could be another input. For instance, if the user frequently calls a first contact, and frequently e-mails a second contact, the algorithm may assign a weight in favor of the first contact, since a telephone call may reflect the existence of a stronger interpersonal relationship than an e-mail. Recent communications may be given more weight than older communications (e.g., a time-decay factor could be applied). Longer communications may be given more weight than shorter communications. The input to the scoring algorithm can also be a combination of such factors.

In operation (F), the server system 120 stores the alias and score(s) from operation (E) in the repository of contact records 124. In this manner the contact records 124 can be augmented to include candidate aliases and associated scores reflecting the likelihood that the potential alias is intended by the user to be associated with the contact records. For example, continuing with the example, the contact record for "Barbara" 154 would have stored in association with it the alias "Mom" and a score 158 of 67%, or 0.67. Similarly, the contact record for "Jane" 156 would have stored in association with it the alias "Mom" and a score 160 of 33%, or 0.33. The repository of contact records 124 is simply an example of a place where the correlation between the contact record and the alias/score can be stored. Alternatively, a separate database could be used, or the address book on the user's mobile device 110 could be directly updated as a result of operation (F).

The example process of FIG. 1A illustrates the performance of operations (A) through (F) as an iterative loop, wherein the loop is repeated until all potential particular aliases have been evaluated through operations (A) through (F). However, operations (A) through (F) could also be performed as a one-time loop process. In either case, after the full completion of (A) through (F), operation (G) can be performed. In other words, in the example alias disambiguation process 140, operation (G) is performed at the completion of running all potential aliases through operations (A) through (F). However, this is only an example of a specific embodiment that could be used. Other variations of the operations and sequence of operations are within the scope of this disclosure.

At operation (G), the augmented contact records are downloaded to the user's mobile device 110. This can take place in the background such that it does not interfere with the use of mobile device 110. At the completion of operation (G), the contact records in the address book of the mobile device 110 may include (in addition to the typical contact records with contact information): (i) aliases associated with contact records and (ii) the scores that are associated with the correlation between aliases and contact records. Any or all of operations (A) through (F) may also be performed on the mobile device 110 itself.

Figure 1B:
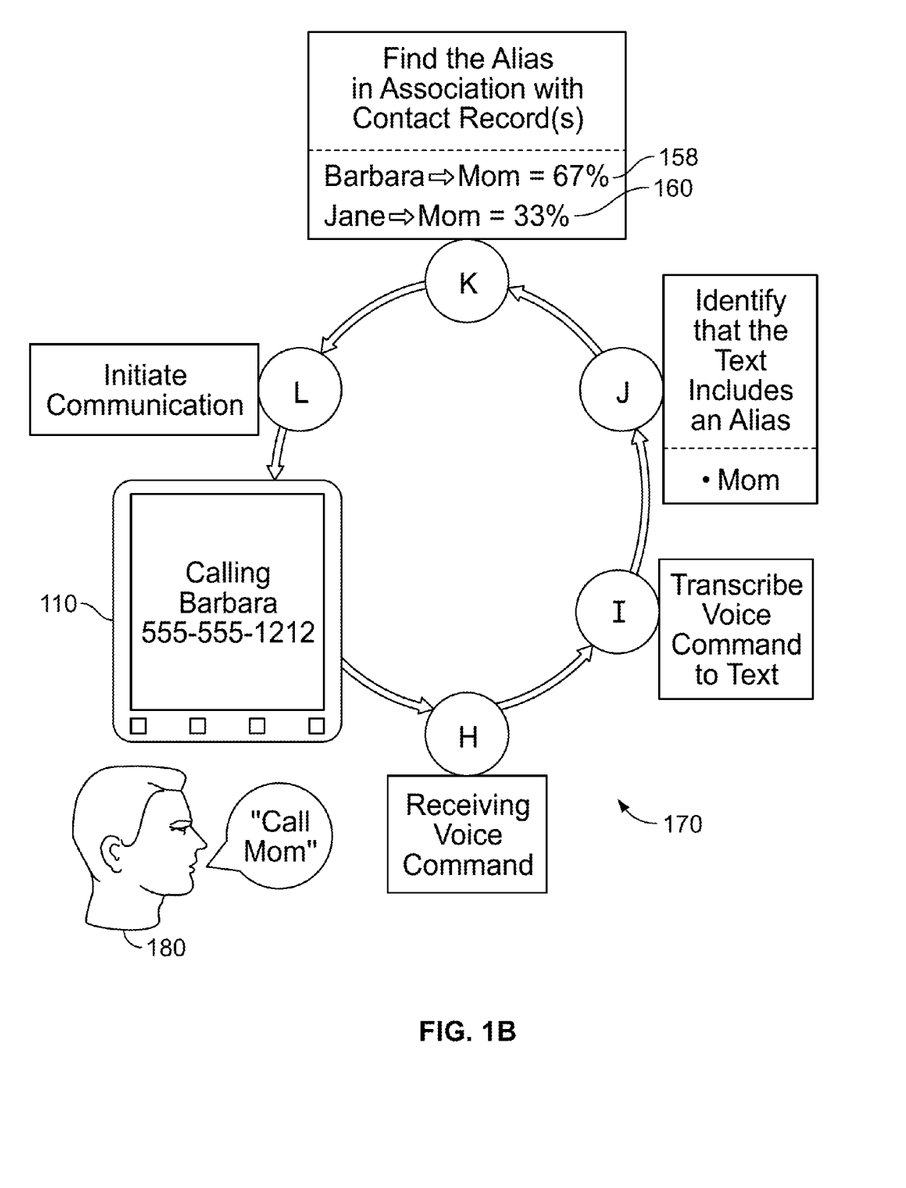
FIG. 1B is a diagram of an example system and process for initiating a communication using the augmented contact records of FIG. 1A.

FIG. 1B is a diagram of an example system and process 170 for initiating a communication using the augmented contact records described above in regard to FIG. 1A. FIG. 1B identifies operations (H) through (L) to illustrate the example process 170.

At operation (H), the mobile device 110 can receive a command to initiate a communication from user 180. For example, user 180 may speak a voice command to initiate a phone call, such as the utterance "call Mom." Alternately, the command can be entered via another user interface, such as a keyboard, touchpad, or touchscreen. Further, the communication type can be, for example, SMS messages, e-mails, instant messages, and social network messages.

At operation (I), the mobile device 110 can transcribe the voice command to text. For example, the utterance received at operation (H) can be phonetically transcribed to text as "call Mom." This operation can be omitted if, for example, the user input a command via a keyboard.

At operation (J), the mobile device 110 can identify that the text from operation (I) includes an alias. If, for example, the mobile device 110 cannot find a contact record that matches the entered text or that has a correlated alias that matches the entered text, the mobile device 110 can evaluate the text as an alias. That is, after determining that it received a command to initiate a communication, such as by recognizing the command "call," the mobile device 110 can search for a contact record that has a contact name or a correlated alias that matches the text following the command "call" (e.g., "Mom"). If a matching contact record is found, then the communication can be initiated. However, if no matching contact record is found, the mobile device 110 can determine that the entered text may be an alias.

At operation (K), the mobile device 110 can find the alias in association with a contact record or multiple contact records. As described above, the contact records in the address book of the mobile device 110 can be augmented with correlations to aliases and scores. For instance, in the example the alias "Mom" is associated with the contact record for "Barbara" with a score 158 of 67%, and associated with the contact for "Jane" with a score 160 of 33%.

At operation (L), the mobile device 110 can initiate a communication. For example, in response to the command "call Mom," the mobile device 110 can initiate a phone call to "Barbara"—because the alias "Mom" is associated with the contact record for "Barbara." The alias correlation scores can be utilized at this operation. For example, the alias correlation scores can be used to determine whether the mobile device 110 should: (i) initiate the communication, or (ii) prompt the user to confirm the contact record to communicate to before initiating the communication. In general, an alias correlation score above a threshold (indicating a high probability the alias corresponds to the contact record) means the communication can be initiated without further user confirmation.

On the other hand, an alias correlation score below a threshold can cause the mobile device 110 to prompt the user to confirm the contact record to communicate to. For example, because two contacts (Barbara and Jane) are correlated to the alias "Mom," the mobile device 110 can prompt the user 180 to select one of them, and then, in response to the selection, initiate the phone call to the selected recipient. A threshold correlation score for determining whether to prompt the user to confirm the contact record can be established at various correlation score levels (e.g., when the score is less than 50%, or less than 75%), and the threshold correlation score can be adjusted by the user.

Figure 2:
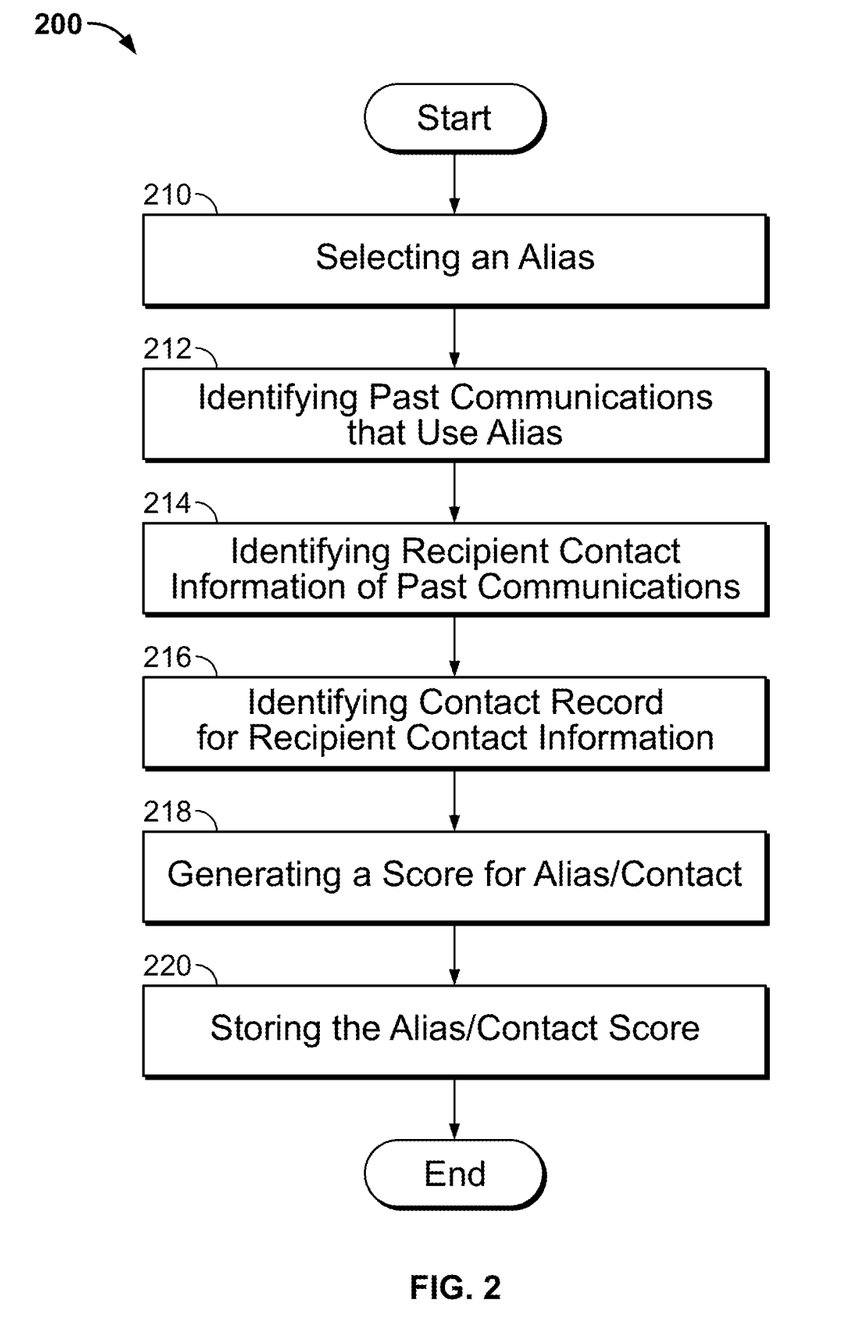
FIG. 2 is a flowchart of an example process for using past communications to augment contact records with correlations to aliases and scores.

FIG. 2 is a flowchart of an example process 200 for using past communications to augment contact records with correlations to aliases and scores. The example process 200 starts by selecting an alias 210. As described earlier, the alias can be selected from a repository of known aliases or selected dynamically. Next, at 212, past communications that contain the selected alias are identified. The identification at 212 can be made by parsing past communications to search for the selected alias. At 214, recipient contact information (e.g., an e-mail address or a phone number) is identified for the past communications that contains the selected alias.

At 216, contact records having the recipient contact information are identified. That is, the contact records can be searched to find contact information entries that match the recipient contact information from the past communications that were identified at operation 214. At 218, a score is generated for the alias-to-contact correlation. In general, the score can represent a probability that the alias corresponds to the contact. Finally, at 220, the alias and score is stored in association with the contact. That is, the contact records in the user's address book can be augmented by storing corresponding aliases and scores in association with the contact records.

Figure 3:
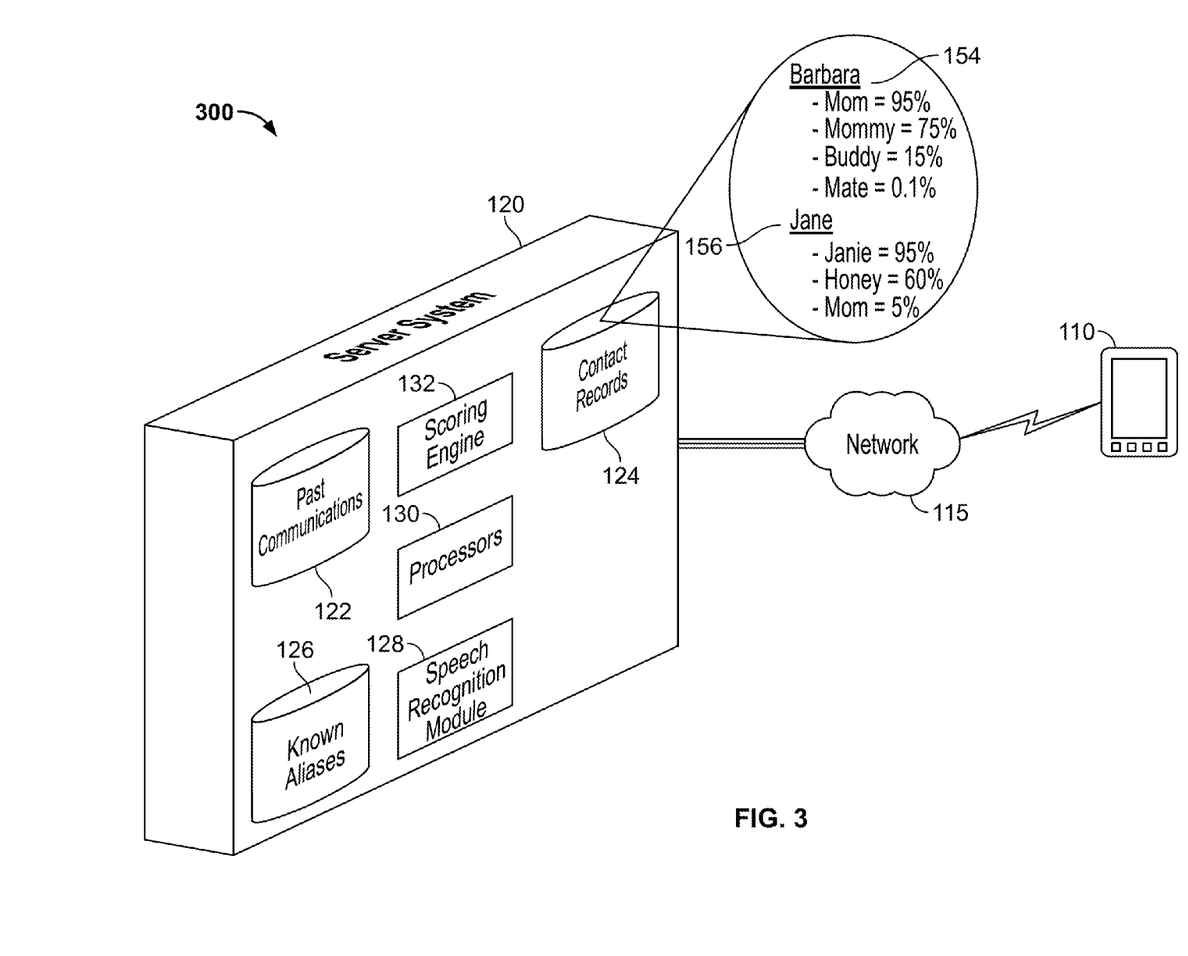
FIG. 3 is a diagram of an example system that uses past communications to augment contact records with correlations to aliases and scores.

FIG. 3 is a diagram of an example system 300 that uses past communications to augment contact records with correlations to aliases and scores. The example system can include a server system 120, a mobile device 110, and one or more networks 115. The server system 120 may comprise one or more servers that store and process information according to coded instructions that comprise an operating system or an application. The mobile device 110 can be a smart phone, PDA, tablet computer, and the like. The one or more networks 115 can include, for example, a wireless network, intranet, Internet, telephone network, and combinations of networks.

The server system 120 can include repositories of past communications 122, contact records 124, and known aliases 126 as described above in regard to FIG. 1A. The individual contact records in the repository of contact records 124 can be augmented with one or more aliases and scores. For example, as shown, the contact record for "Barbara" 154 can include the following aliases and scores: "Mom" at 95%, "Mommy" at 75%, "Buddy" at 15%, and "Mate" at 0.1%. Similarly, the contact record for "Jane" 156 can include the following aliases and scores: "Janie" at 95%, "Honey" at 60%, and "Mom" at 5%. The server system 120 can further include a speech recognition module 128. Alternately, the speech recognition function can take place on the mobile device 110, or by a combination of both the server system 120 and the mobile device 110.

The speech recognition module 128 can transcribe user input spoken to mobile device 110 to text. The server system 120 can also include one or more processors 130 that execute coded instructions, such as instructions to parse past communications to search for an alias as described above regarding FIG. 1A. The server system 132 can include a scoring engine 132. The scoring engine 132 can determine a score for the correlation of an alias to a contact record. To do so, the scoring engine can apply an algorithm to various factors, such as the frequency of an alias in past communications, the age of those communications, and the location of an alias within the communications. The score can be stored with the associated contact record and alias in the repository of contact records 124, or as a separate look-up table. The contact records that are augmented with the alias and scores can be downloaded to the mobile device 110 over the network 115.

Figure 4:
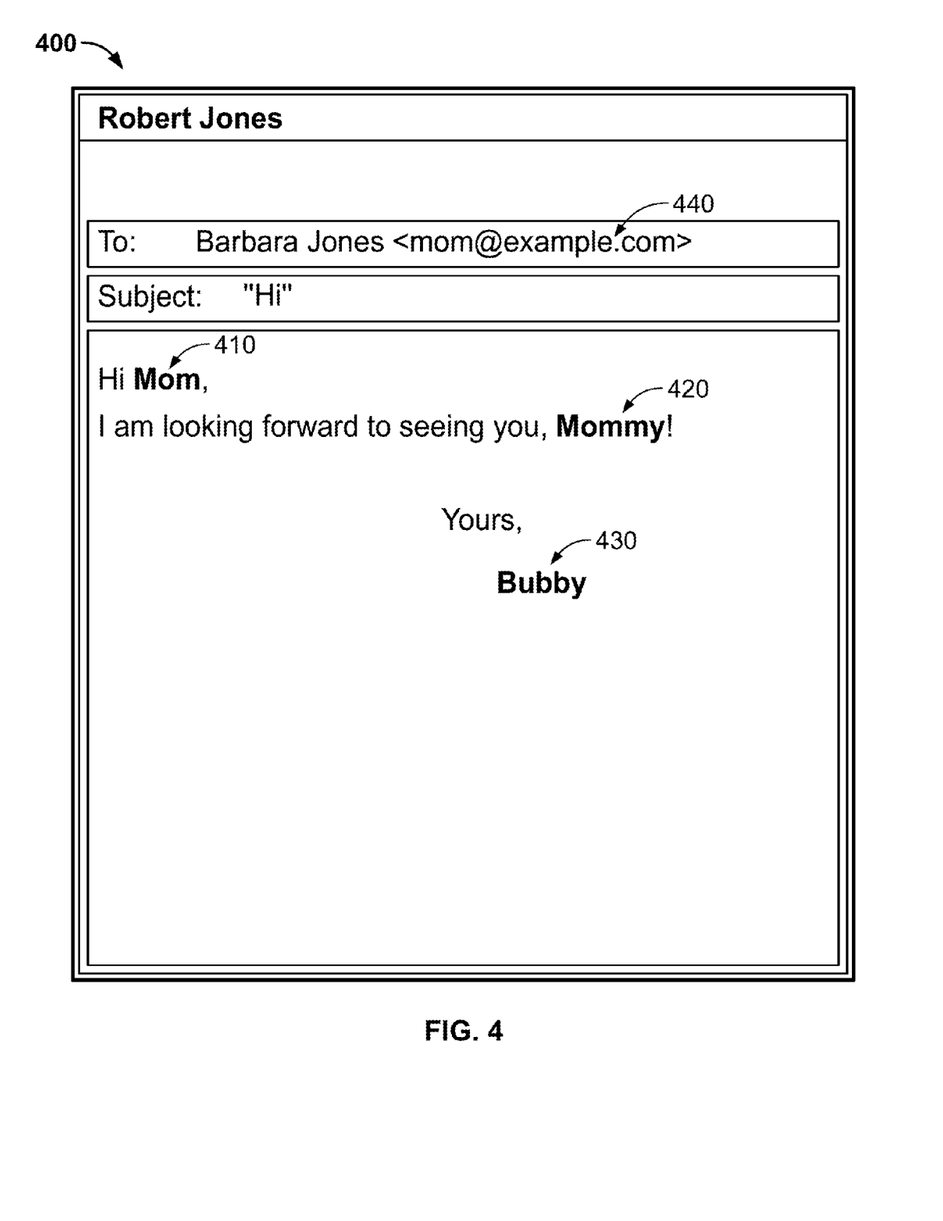
FIG. 4 is an example of a past communication depicting the use of aliases.

FIG. 4 is an example of a past communication 400 that depicts the use of aliases. This past communication 400 is an example of an e-mail communication that can be stored in a communication archive 122, and parsed to search for aliases in accordance with example process 200 for using past communications to augment contact records with correlations to aliases and scores. As described above, other types of communications besides e-mail messages can also be past communications. The alias "Mom" 410 can be a known alias from the alias database 126 as described above. Further, the location of "Mom" 410 within the communication, i.e. right after the salutation, can enable it to be dynamically identified as an alias.

Further, the location of "Mom" 410 right after the salutation can be taken into account in the scoring algorithm. For example, the scoring algorithm can consider that location as indicating a strong possibility that the recipient of the communication is referred to by the user as "Mom." "Mommy" 420 is an example of another known alias. The alias "Bubby" 430 could also be dynamically identified as an alias, as described above, as a result of its location within the communication 400. The e-mail address "mom@example.com" 440 can be identified as the contact information for this past communication 400. As described above, the contact records 124 can be searched for a contact information entry matching "mom@example.com" 440. If a match is found, the aliases found 410/420/430 in the past communication 400 can be correlated to the contact record, along with their scores as determined by the scoring algorithm.

A number of implementations have been described. Nevertheless, it will be understood that various modifications may be made without departing from the spirit and scope of the disclosure. For example, various forms of the flows shown above may be used, with operations re-ordered, added, or removed. Accordingly, other implementations are within the scope of the following claims.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments have been described. Other embodiments are within the scope of the following claims. For example, the actions recited in the claims may be performed in a different order and still achieve desirable results.

What is claimed is:

1. A computer-implemented method comprising:
obtaining a communication associated with a user;
selecting a term that occurs in a particular position in a body of the communication;
determining that the term does not match a name of a contact included in contact records of the user;
classifying the term as a candidate alias based at least on determining that the term does not match a name of a contact included in the contact records of the user;
in response to classifying the term as a candidate alias, determining that the term occurs in a subset of past communications of the user, the subset of past communications being collectively associated with a subset of multiple existing contact records associated with an address book of the user;
in response to determining that the term occurs in the subset of past communications of the user, generating, for each of the existing contact records of the subset of multiple existing contact records associated with the address book of the user, an updated contact record indicating (i) the term and (ii) a score that represents an estimated confidence that the term corresponds to the updated contact record, wherein the score is generated based at least on the subset of past communications of the user; and
transmitting, for each of the existing multiple contact records, the updated contact record to a mobile device associated with the user.

2. The method of claim 1, wherein in response to determining that the term occurs in the subset of past communications of the user, generating, for each of the existing contact records of the subset of multiple existing contact records associated with the address book of the user, an updated contact record indicating (i) the term and (ii) a score that represents an estimated confidence that the term corresponds to the updated contact record, comprises:
for each past communication of the subset of past communications, identifying contact information associated with the past communication;
for each identified contact information, determining that an existing contact record of the subset of multiple existing contact records is associated with the identified contact information; and
for each of the existing contact records of the subset of contact records, generating the score indicated by a corresponding updated contact record based on a number of times the existing contact record is determined to be associated with contact information that is identified in the subset of past communications.

3. The method of claim 2, wherein generating the score indicated by the corresponding updated contact record is further based on forms of the past communications of the subset of past communications.

4. The method of claim 2, wherein generating the score indicated by the corresponding updated contact record is further based on a particular position of the term in the past communications of the subset of past communications.

5. The method of claim 1, wherein the updated contact record indicates (i) another term and (ii) another score that represents an estimated confidence that the other term corresponds to the updated contact record.

6. The method of claim 1, comprising:
obtaining another communication associated with the user;
selecting another term that occurs in a particular position in a body of the other communication;
determining that the other term does not match a name of a contact included in contact records of the user;
classifying the other term as another candidate alias based at least on determining that the other term does not match a name of a contact included in the contact records of the user;
in response to classifying the other term as another candidate alias, determining that the other term occurs in another subset of past communications of the user, the other subset of past communications being collectively associated with another subset of multiple existing contact records associated with the address book of the user;
in response to determining that the other term occurs in the other subset of past communications of the user, generating, for each of the existing contact records of the other subset of multiple existing contact records associated with the address book of the user, another updated contact record indicating:
(i) the other term and (ii) another score that represents an estimated confidence that the other term corresponds to the updated contact record, wherein the other score is generated based at least on the other subset of past communications of the user; and;
(i) the term and (ii) the score that represents the estimated confidence that the term corresponds to the updated contact record wherein the score is generated based at least on the subset of past communications of the user; and
transmitting the other updated contact record to the mobile device associated with the user.

7. The method of claim 1, wherein determining that the term occurs in a subset of past communications of the user comprises:
determining that text corresponding to the term occurs in text corresponding to each of the past communications of the subset of past communications of the user.

8. A system comprising:
one or more computers and one or more storage devices storing instructions that are operable, when executed by the one or more computers, to cause the one or more computers to perform operations comprising:
obtaining a communication associated with a user;
selecting a term that occurs in a particular position in a body of the communication;
determining that the term does not match a name of a contact included in contact records of the user;
classifying the term as a candidate alias based at least on determining that the term does not match a name of a contact included in the contact records of the user;
in response to classifying the term as a candidate alias, determining that the term occurs in a subset of past communications of the user, the subset of past communications being collectively associated with a subset of multiple existing contact records associated with an address book of the user;

in response to determining that the term occurs in the subset of past communications of the user, generating, for each of the existing contact records of the subset of multiple existing contact records associated with the address book of the user, an updated contact record indicating (i) the term and (ii) a score that represents an estimated confidence that the term corresponds to the updated contact record, wherein the score is generated based at least on the subset of past communications of the user; and transmitting, for each of the existing multiple contact records, the updated contact record to a mobile device associated with the user.

9. The system of claim 8, wherein in response to determining that the term occurs in the subset of past communications of the user, generating, for each of the existing contact records of the subset of multiple existing contact records associated with the address book of the user, an updated contact record indicating (i) the term and (ii) a score that represents an estimated confidence that the term corresponds to the updated contact record, comprises:

for each past communication of the subset of past communications, identifying contact information associated with the past communication;

for each identified contact information, determining that an existing contact record of the subset of multiple existing contact records is associated with the identified contact information; and for each of the existing contact records of the subset of contact records, generating the score indicated by a corresponding updated contact record based on a number of times the existing contact record is determined to be associated with contact information that is identified in the subset of past communications.

10. The system of claim 9, wherein generating the score indicated by the corresponding updated contact record is further based on forms of the past communications of the subset of past communications.

11. The system of claim 9, wherein generating the score indicated by the corresponding updated contact record is further based on a particular position of the term in the past communications of the subset of past communications.

12. The system of claim 8, wherein the updated contact record indicates (i) another term and (ii) another score that represents an estimated confidence that the other term corresponds to the updated contact record.

13. The system of claim 8, the instructions comprising:
obtaining another communication associated with the user;
selecting another term that occurs in a particular position in a body of the other communication;
determining that the other term does not match a name of a contact included in contact records of the user;
classifying the other term as another candidate alias based at least on determining that the other term does not match a name of a contact included in the contact records of the user;
in response to classifying the other term as another candidate alias, determining that the other term occurs in another subset of past communications of the user, the other subset of past communications being collectively associated with another subset of multiple existing contact records associated with the address book of the user;
in response to determining that the other term occurs in the other subset of past communications of the user, generating, for each of the existing contact records of the other subset of multiple existing contact records associated with the address book of the user, another updated contact record indicating:
(i) the other term and (ii) another score that represents an estimated confidence that the other term corresponds to the updated contact record, wherein the other score is generated based at least on the other subset of past communications of the user; and;
(i) the term and (ii) the score that represents the estimated confidence that the term corresponds to the updated contact record wherein the score is generated based at least on the subset of past communications of the user; and transmitting the other updated contact record to the mobile device associated with the user.

14. The system of claim 8, wherein determining that the term occurs in a subset of past communications of the user comprises:
determining that text corresponding to the term occurs in text corresponding to each of the past communications of the subset of past communications of the user.

15. A non-transitory computer-readable medium storing software comprising instructions executable by one or more computers which, upon such execution, cause the one or more computers to perform operations comprising:
obtaining a communication associated with a user;
selecting a term that occurs in a particular position in a body of the communication;
determining that the term does not match a name of a contact included in contact records of the user;
classifying the term as a candidate alias based at least on determining that the term does not match a name of a contact included in the contact records of the user;
in response to classifying the term as a candidate alias, determining that the term occurs in a subset of past communications of the user, the subset of past communications being collectively associated with a subset of multiple existing contact records associated with an address book of the user;
in response to determining that the term occurs in the subset of past communications of the user, generating, for each of the existing contact records of the subset of multiple existing contact records associated with the address book of the user, an updated contact record indicating (i) the term and (ii) a score that represents an estimated confidence that the term corresponds to the updated contact record, wherein the score is generated based at least on the subset of past communications of the user; and
transmitting, for each of the existing multiple contact records, the updated contact record to a mobile device associated with the user.

16. The medium of claim 15, wherein in response to determining that the term occurs in the subset of past communications of the user, generating, for each of the existing contact records of the subset of multiple existing contact records associated with the address book of the user, an updated contact record indicating (i) the term and (ii) a score that represents an estimated confidence that the term corresponds to the updated contact record, comprises:
for each past communication of the subset of past communications, identifying contact information associated with the past communication;
for each identified contact information, determining that an existing contact record of the subset of multiple existing contact records is associated with the identified contact information; and for each of the existing contact records of the subset of contact records, generating the score indicated by a corresponding updated contact record based on a number of times the existing contact record is determined to be associated with contact information that is identified in the subset of past communications.

17. The medium of claim 16, wherein generating the score indicated by the corresponding updated contact record is further based on forms of the past communications of the subset of past communications.

18. The medium of claim 16, wherein generating the score indicated by the corresponding updated contact record is further based on a particular position of the term in the past communications of the subset of past communications.

19. The medium of claim 15, wherein the updated contact record indicates (i) another term and (ii) another score that represents an estimated confidence that the other term corresponds to the updated contact record.

20. The medium of claim 15, the instructions comprising:
    obtaining another communication associated with the user;
    selecting another term that occurs in a particular position in a body of the other communication;
    determining that the other term does not match a name of a contact included in contact records of the user;
    classifying the other term as another candidate alias based at least on determining that the other term does not match a name of a contact included in the contact records of the user;
    in response to classifying the other term as another candidate alias, determining that the other term occurs in another subset of past communications of the user, the other subset of past communications being collectively associated with another subset of multiple existing contact records associated with the address book of the user;
    in response to determining that the other term occurs in the other subset of past communications of the user, generating, for each of the existing contact records of the other subset of multiple existing contact records associated with the address book of the user, another updated contact record indicating:
        (i) the other term and (ii) another score that represents an estimated confidence that the other term corresponds to the updated contact record, wherein the other score is generated based at least on the other subset of past communications of the user; and;
        (i) the term and (ii) the score that represents the estimated confidence that the term corresponds to the updated contact record wherein the score is generated based at least on the subset of past communications of the user; and
    transmitting the other updated contact record to the mobile device associated with the user.

21. The medium of claim 15, wherein determining that the term occurs in a subset of past communications of the user comprises:
    determining that text corresponding to the term occurs in text corresponding to each of the past communications of the subset of past communications of the user.

* * * * *